July 20, 1926.  A. KUNZ  1,593,499
DENTAL PLIERS
Filed Dec. 6, 1924
Fig. 1a. 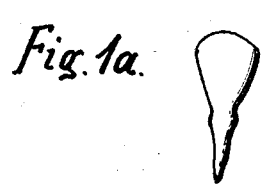  Fig. 2. 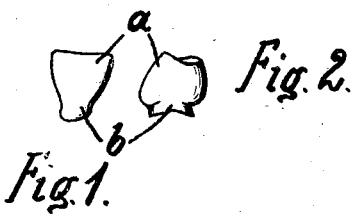
Fig. 1.
Fig. 3. 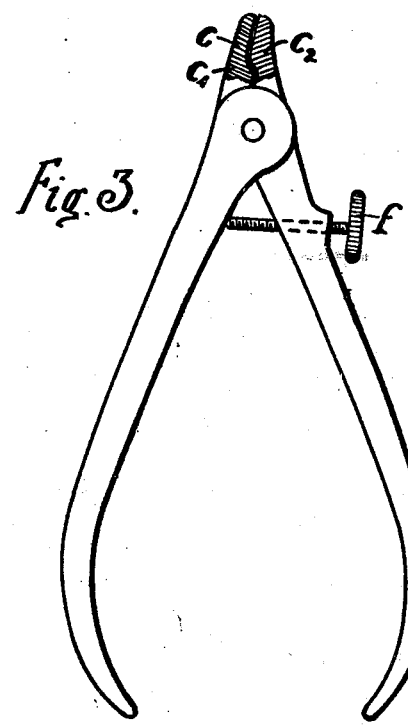  Fig. 4. 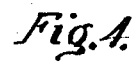

Fig. 6.   Fig. 9. 
Fig. 7. 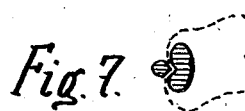  Fig. 10. 
Inventor
Alfred Kunz Patented July 20, 1926.

1,593,499

UNITED STATES PATENT OFFICE.

ALFRED KUNZ, OF HEIDELBERG, GERMANY.

DENTAL PLIERS.

Application filed December 6, 1924, Serial No. 754,361, and in Germany December 3, 1923.

This invention relates to the manufacture of anatomically correctly formed tooth crowns of metal, more particularly of the ring for such tooth crowns. According to the invention the crown ring is given its basic shape by making certain impressions in it at suitable places next to one another, but extending in each case over the entire height of the ring including the cervical border of the tooth by means of a suitably formed tool. If the periphery of the finished tooth is to have prominences and indentations next to them, these are formed subsequently or in certain cases beforehand by single and separate applications of pressure. It is therefore essential that each pressure applied to the crown ring shall extend over its entire height including the cervical border and that these separate pressures shall be applied at points distributed over the whole periphery.

The new method and the tool for carrying it out are shown diagrammatically in the drawing.

Fig. 1 shows the form of the ring corresponding to a premolar tooth according to Fig. 1a as seen from the side facing the cheek, this form representing the basic form.

Fig. 2 shows the same ring form seen from the side.

Fig. 3 shows the pliers for producing the form, the jaws of the pliers being in section.

Fig. 4 is an end view of the jaws of the pliers.

Fig. 6 is a section through the corresponding plier jaws.

Fig. 7 is a section view of the jaws.

Fig. 9 is a section through the corresponding jaws of the pliers.

Fig. 10 is a section view of the same.

Figures 5, 5A, 8, 8A:
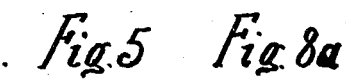
Fig. 5 shows the ring form corresponding to an upper molar tooth according to Fig. 5a (from the side facing the cheek).
Fig. 8 shows the ring form corresponding to the lower molar tooth shown in Fig. 8a (from the side facing the cheek).

The usual suitably cut-out metal ring $a$ is given the basic form shown in Fig. 1 by making successive impressions in it extending over its entire height and at the same time producing the so-called cervical border $b$ in the lower part. This basic form corresponds to that required for teeth having one fang and for premolar teeth.

This basic form is preferably made by means of a pair of pliers, such as shown in Figs. 3 and 4. The dies $c$ of the pliers extend over the entire height of the ring to be formed and at the end $c_1$ have the necessary shape for forming the cervical border $b$ at the same time. The ring is formed by means of the pliers, by inserting the convex jaw $c_2$ into the metal ring and placing the pliers substantially in the direction of the axis of the ring. Thereupon impressions are made next to one another on the sides of the ring facing the cheek and the tongue and extending partly into the approximal surfaces. This will result in the basic shape shown in Figs. 1, 5 and 8.

If the crown rings are to have a number of prominences on their periphery, such as is the case with molar teeth, the surface of the tooth is suitably divided up by being pressed in or indented, which may be effected either before or after the basic form shown in Figs. 1, 5 and 8 is made. When there are two prominences either on the side facing the cheek or the side facing the gums, as in the case of the upper molars (Fig. 5a), the ring will be given the basic shape shown in Fig. 5. The prominences are preferably formed by pliers of the kind shown in Figs. 6 and 7 with an indentation extending from the top to the bottom, this being effected either before or preferably after the ring is given its basic form by the pliers shown in Fig. 3, which can be used for giving the tooth its final anatomically correct shape after the prominences have been formed.

For making rings for the lower molars, corresponding to Fig. 8a, which have three prominences on the side facing the cheek, the ring is given the shape shown in Fig. 8. For this purpose the pliers with two indentations shown in Figs. 9 and 10 are preferably used. In this case the complete middle prominence and a portion of each of the prominences on either side of it are made simultaneously by means of the pliers. For giving the ring its final form the pliers shown in Fig. 3 are used. The three prominences could however be impressed by twice using the pliers for a single indentation, shown in Figs. 6 and 7. For dividing the two prominences on the side of the lower molar facing the tongue the pliers for giving a single indentation shown in Figs. 6 and 7 are used and the final shape is again given by the pliers shown in Fig. 3.

The dies of the pliers shown in Figs. 6, 7 and 9, 10 are also suitably shaped for pressing the cervical border so that the latter is formed at the same time as the prominences.

Instead of using three pairs of pliers a single pair may be used, in which case the dies may be made removable. An adjustable screw $f$ may be used for limiting the amount, by which the jaws may be approached to one another.

It will be seen that in the manner described any shape of tooth may be made rapidly with only three or two pliers so as to approximate very closely to the natural shapes, without any special practice being required.

What I claim is:—

A pressing tool for shaping the ring portion, of a tooth crown including pivoted jaws the inner portion of one of which is provided with a transverse depression, a transverse rib formed on the inner surface of the other jaw and positioned opposite the depression and adapted to form the cervical border in the crown ring, the inner surfaces of the outer portions of the jaws being respectively provided with longitudinally arranged and opposed ribbed and grooved portions for providing indentations and bulged portions on the crown ring at the same time the cervical border is formed, the jaws being of a height approximately equal to the height of the ring and of a width to extend over only a small portion of the periphery of the ring to facilitate the application of separate single impressions in the ring, substantially as and for the purposes set forth.

In testimony whereof I have signed my name to this specification.

ALFRED KUNZ.